United States Patent
Kussmaul et al.

(10) Patent No.: US 11,188,512 B2
(45) Date of Patent: Nov. 30, 2021

(54) REWRITING CORPUS CONTENT IN A SEARCH INDEX AND PROCESSING SEARCH QUERIES USING THE REWRITTEN SEARCH INDEX

(71) Applicant: International Business Machines Corporation, Armonk, NY (US)

(72) Inventors: Timo Kussmaul, Boeblingen (DE); Uwe Hansmann, Tuebingen (DE)

(73) Assignee: International Business Machines Corporation, Armonk, NY (US)

(*) Notice: Subject to any disclaimer, the term of this patent is extended or adjusted under 35 U.S.C. 154(b) by 68 days.

(21) Appl. No.: 16/733,365

(22) Filed: Jan. 3, 2020

(65) Prior Publication Data

US 2021/0209086 A1  Jul. 8, 2021

(51) Int. Cl.
*G06F 16/00* (2019.01)
*G06F 16/22* (2019.01)
*G06F 16/242* (2019.01)

(52) U.S. Cl.
CPC ...... *G06F 16/2272* (2019.01); *G06F 16/2425* (2019.01)

(58) Field of Classification Search
None
See application file for complete search history.

(56) References Cited

U.S. PATENT DOCUMENTS

| | | | |
|---|---|---|---|
| 8,583,808 B1 | 11/2013 | Nevill-Manning et al. | |
| 9,767,182 B1 | 9/2017 | Thakur et al. | |
| 10,296,658 B2 | 5/2019 | Le Biannic et al. | |
| 2010/0114864 A1 | 5/2010 | Agam et al. | |
| 2012/0173581 A1 | 7/2012 | Hartig et al. | |
| 2013/0159318 A1 | 6/2013 | Xu et al. | |
| 2014/0025701 A1 | 1/2014 | Zhu et al. | |
| 2014/0115444 A1 | 4/2014 | Vasquez Lopez et al. | |
| 2015/0161276 A1 | 6/2015 | Upstill et al. | |
| 2015/0278305 A1 | 10/2015 | Beilmann et al. | |
| 2016/0371288 A1 | 12/2016 | Le Biannic et al. | |
| 2017/0364518 A1 | 12/2017 | Harris et al. | |
| 2018/0300982 A1 | 10/2018 | Jarnagin | |
| 2018/0373799 A1 | 12/2018 | Koren et al. | |
| 2021/0209105 A1 | 7/2021 | Kussmaul et al. | |
| 2021/0209106 A1 | 7/2021 | Kussmaul et al. | |

OTHER PUBLICATIONS

List of IBM Patents or Patent Applications Treated as Related, Jul. 2021, 1 page.

*Primary Examiner* — Bai D Vu

(74) *Attorney, Agent, or Firm* — John Noh; SVL IPLaw

(57) ABSTRACT

A method, a computing system, and a computer program product are provided for processing search queries. A computing device executing a content management system receives a content rewriting rule. A content item including the content rewriting rule is stored. The stored content rewriting rule is associated with a first search index, which includes indexed content of a corpus having unstructured textual content. The content of the corpus is rewritten into a second search index of an index overlay structure by applying the content rewriting rule to the content of the corpus. The second search index is used for searching the content of the corpus for content satisfying a received search query.

20 Claims, 7 Drawing Sheets

REWRITING CORPUS CONTENT IN A SEARCH INDEX AND PROCESSING SEARCH QUERIES USING THE REWRITTEN SEARCH INDEX

BACKGROUND

1. Technical Field

Present invention embodiments relate to search engines for searching a corpus of textual documents, and more specifically, to optimizing a search index of a search service to improve a quality of search results.

2. Discussion of the Related Art

Quality of search results from a service for searching a corpus of textual documents depends on a structure of the corpus. Today, data analysts try to improve a structure of a corpus by identifying most likely relevant fields of the corpus that should be considered when ranking search results. In addition, the data analysts also try to determine optimal boosting factors for controlling ranking of the search results.

Currently, improving a structure of a corpus in order to improve a quality of search results is an iterative process in which a data analyst identifies "important" fields (e.g., fields that are most relevant to consider when ranking search results) and maps those fields to appropriate fields in a search engine schema. Next, the corpus is imported to fill the appropriate fields in the search engine schema from content of the identified "important" fields. Following this, the data analyst runs a series of test queries to determine if search results of those test queries match expectations. If the search results do not match the expectations, the data analyst either modifies the search engine schema or the mapping to the appropriate fields and imports the entire corpus again to fill the appropriate fields in the search engine schema from content of the identified "important" fields. This process is repeated until the search results match the expectations. This process can be very time consuming.

SUMMARY

According to one embodiment of the present invention, a computer-implemented method is provided for processing search queries. A computing device executing a content management system receives a content rewriting rule. The computing device stores a content item including the content rewriting rule. The stored content rewriting rule is associated with a first search index, which includes indexed content of a corpus having unstructured textual content. The content of the corpus is rewritten into a second search index of an index overlay structure by applying the content rewriting rule to the content of the corpus. The computing device uses the second search index to search the content of the corpus for content satisfying a received search query.

According to a second embodiment of the present invention, a computing system is provided for processing search queries. The computing system includes at least one processor and a memory connected to the at least one processor. The at least one processor is configured to perform a number of steps. According to the steps, a content rewriting rule is received. A content item including the content rewriting rule is stored. The stored content rewriting rule is associated with a first search index, which includes indexed content of a corpus having unstructured textual content. The content of the corpus is rewritten into a second search index of an index overlay structure by applying the content rewriting rule to the content of the corpus. The second search index is used to search the content of the corpus for content satisfying a received search query.

According to a third embodiment of the present invention a computer program product is provided for processing search queries. The computer program product includes at least one computer readable storage medium having computer readable program code embodied therewith for execution on one or more processors. The computer readable program code is configured to be executed by the one or more processors to perform a number of steps. According to the steps, a content rewriting rule is received and a content item including the content rewriting rule is stored. The stored content rewriting rule is associated with a first search index, which includes indexed content of a corpus having unstructured textual content. The content of the corpus is rewritten into a second search index of an index overlay structure by applying the content rewriting rule to the content of the corpus. The second search index is used to search the content of the corpus for content satisfying a received search query.

BRIEF DESCRIPTION OF THE DRAWINGS

Generally, like reference numerals in the various figures are utilized to designate like components.

DETAILED DESCRIPTION

In various embodiments, a system, a method, and a computer program product are provided for automatically creating an optimized search index for searching content of a corpus of textual documents in a content management system. The corpus may include unstructured textual documents.

The content management system may receive one or more content rewriting rules, which may be stored in one or more corresponding content items in a search index. The search index may further have, stored therein, content items including content of the corpus mapped to fields that are expected to be relevant to ranking of the search results. An index overlay structure may be created and the one or more content rewriting rules may be applied to the corpus such that a new search index for the corpus may be created in the index overlay structure. The new search index may include content items including content of the corpus rewritten according to the one or more applied content rewriting the rules. After creation of the new search index in the index overlay structure, the new search index may be provided to a search service to be used to produce search results for search queries. Because an original search index may be left unchanged, the original search index may also be used by the search service to produce search results for search queries.

The above and other aspects of various embodiments are discussed in more detail below.

Figure 1:
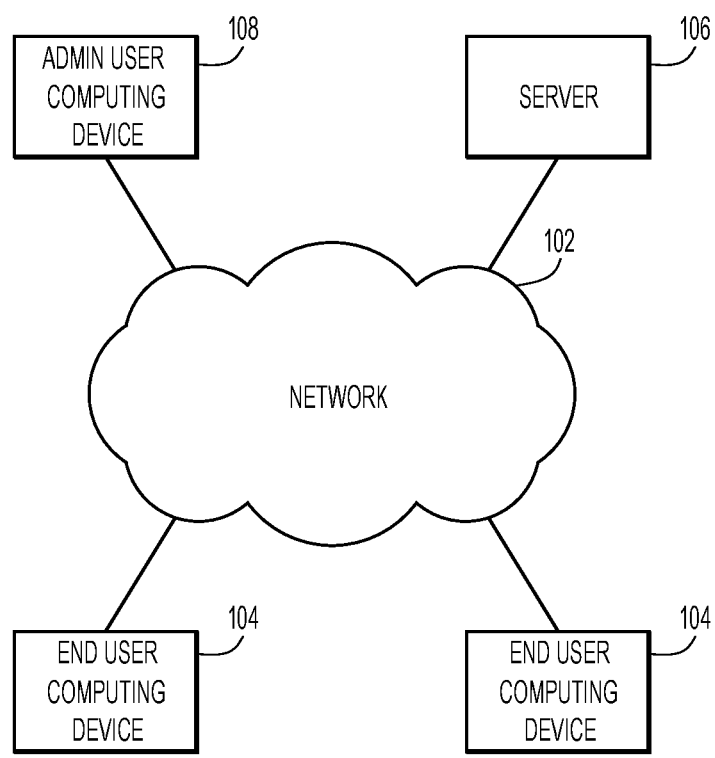
FIG. 1 is a diagrammatic illustration of an example computing environment according to an embodiment of the present invention.

An example environment for use with present invention embodiments is illustrated in FIG. 1. Specifically, the environment includes one or more servers 106, one or more client or end-user computing devices 104, and one or more administrative user computing devices 108. Servers 106, end user computing devices 104, and administrative user computing devices 108 may be remote from each other and may communicate over a network 102. Network 102 may be implemented by any number of any suitable communications media (e.g., wide area network (WAN), local area network (LAN), Internet, Intranet, etc.). Alternatively, server 106, end user computing devices 104, and administrative user computing devices 108 may be local to each other, and may communicate via any appropriate local communication medium (e.g., local area network (LAN), hardwire, wireless link, Intranet, etc.).

End user computing devices 104 enable users and client applications to submit search queries to and receive search results from a search service of a content management system. An administrative user may create content rewriting rules, which may be provided to server 106 executing the content management system. The administrative user may create content rewriting rules either on administrative user computing device 108 or directly on server 106. Similarly, the administrative user may add content to a corpus of documents either via administrative computing device 108 or by directly using server 106.

Figure 2:
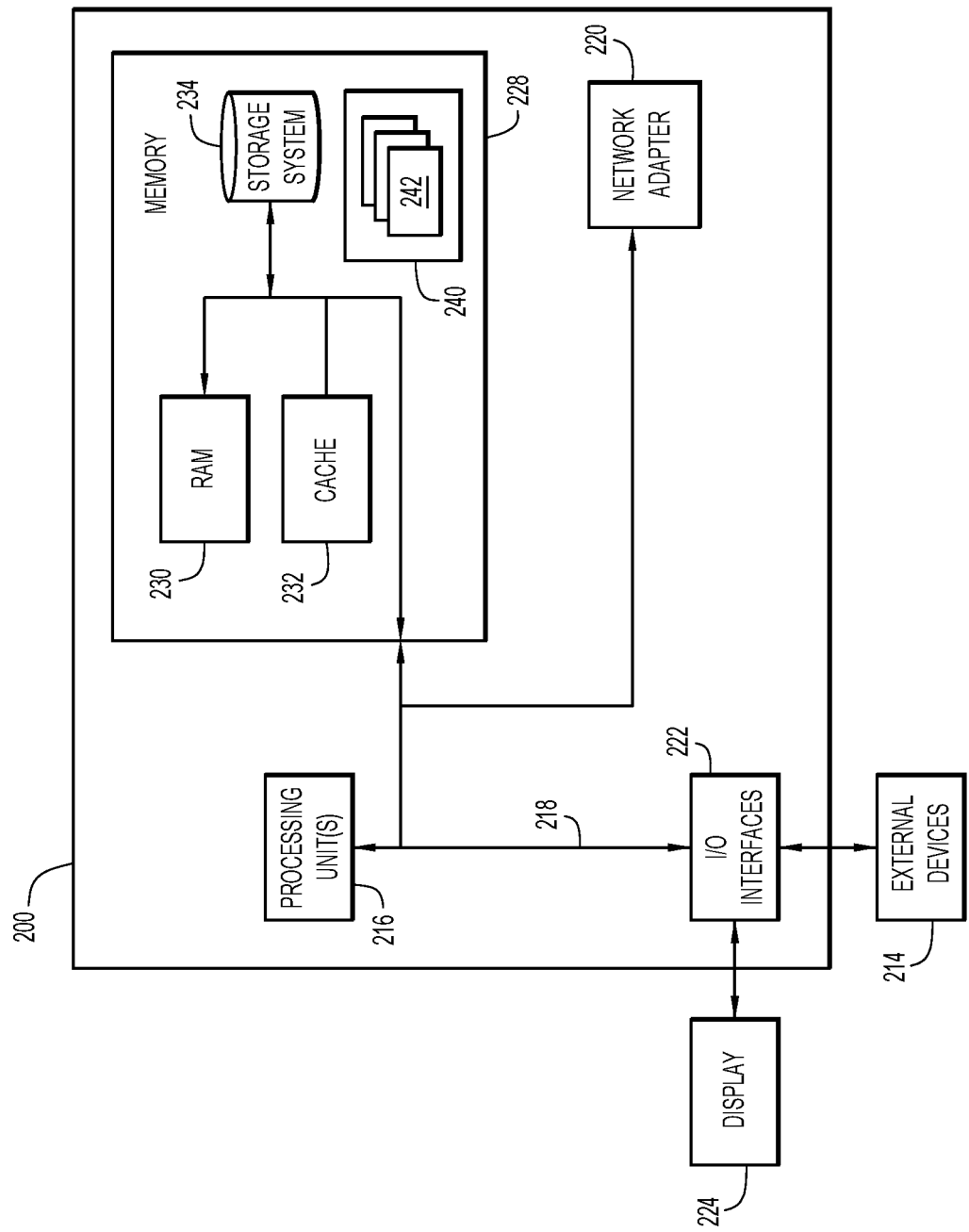
FIG. 2 is a block diagram of an example computing device according to an embodiment of the present invention.

Referring now to FIG. 2, a schematic of an example computer system 200 is shown, which may implement any of computing devices 104, 106 and 108 in various embodiments. Computer system 200 is shown in a form of a general-purpose computing device. Computer system 200 is operational with numerous other general purpose or special purpose computing system environments or configurations. Examples of well-known computing systems, environments, and/or configurations that may be suitable for use with computer system 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
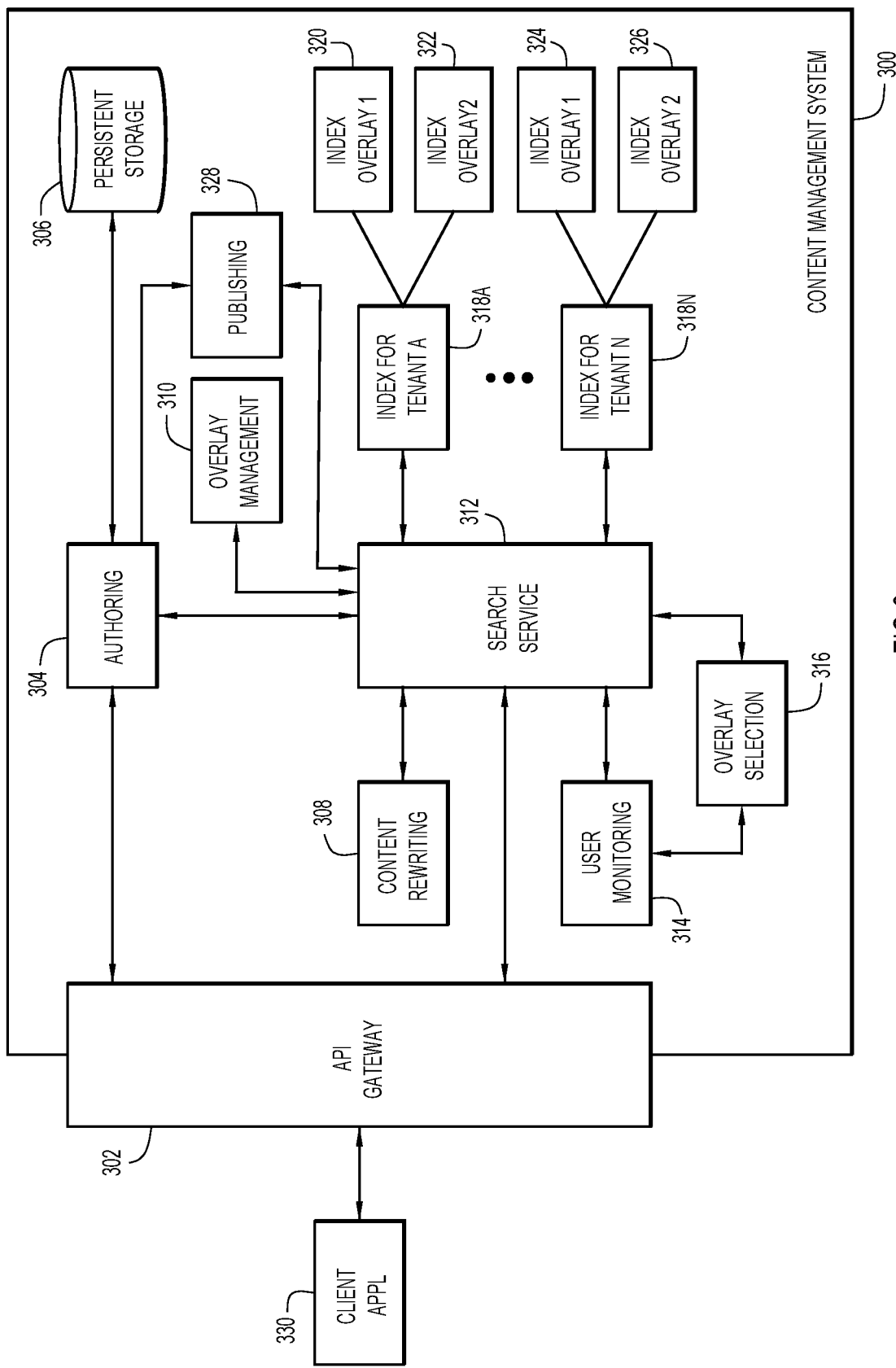
FIG. 3 is a block diagram of an example system architecture according to an embodiment of the present invention.

Content management systems are often deployed in a cloud computing environment and are implemented as a set of interacting services. FIG. 3 shows an example system architecture of a content management system 300 that may be employed in various embodiments. Content management system 300 may include an application program interface (API) gateway 302, an authoring component 304, persistent storage 306, a content rewriting component 308, an overlay management component 310, a search service 312, a user monitoring component 314, an overlay selection component 316, search indexes 318A-318N for tenants of a multitenant content management system, index overlay structures 320-326, and a publishing component 328. Components (e.g., content rewriting 308, overlay management component 310, user monitoring component 314, overlay selection component 316, and index overlay structures 320-326) shown with a thicker line than other components are newly added components for implementing various embodiments.

API Gateway 302 may provide an API to client applications 330, authoring applications, and other applications, and may forward requests and responses between the applications and services provided by the content management service.

Content management systems manage creation of digital content items such as, for example, text documents, webpages, images, videos, code scripts, etc. Typically, a content management system supports multiple users in a collaborative environment. Modern enterprise-scale content management systems are often based on separate content authoring and content delivery systems such that different requirements for content creation and retrieval tasks can be met. Creating, modifying and editing content may take place in authoring component 304 in content management system 300. Authoring component 304 may store content in persistent storage 306.

Authoring component 304 may provide an authoring user interface for editing and managing content items, or may provide authoring APIs, which a client application 330 may access via API Gateway 302. Authoring component 304 also may allow files to be uploaded or imported.

Publishing component 328 may be responsible for transferring content from authoring component 304 to publishing component 328. Content may be transferred in an as-is form or may be transformed (e.g., pre-render templates). Publishing component 328 may publish content items from authoring component 304 to a delivery system like a content delivery network (CDN) (not shown) to make content easily available to the public. The publishing component may provide other functionality such as, for example, indexing content items in a search index, modifying, transforming or pre-rendering content items, as well as other functionality. Publishing may be started manually by a content author, may be invoked according to a schedule, or may be invoked through a publishing API operation.

Content management system 300 may include search service 312. Alternatively, content management system 300 may use a search service that is external to content management system 300. Authoring component 304 may provide the capability for content authors to search for content items. Authoring component 304 may index content items in an authoring index when the content items are created, updated or deleted. Publishing component 328 may index content items in a delivery search index during publishing to provide client applications a capability for searching content. The publishing component also may update a configuration of the delivery search index and may invoke a learning to rank method in a training mode in order to recalculate a ranking model.

In some embodiments, content rewriting rules for rewriting content to a search index may be created manually by an administrator. The administrator may use a content authoring subsystem, which may be included in authoring component 304, to create and edit content items, including content rewriting rules. The content rewriting rules may be written in an if-then format in some embodiments, wherein an IF portion of the rule defines a condition and a THEN portion defines an action to perform when the condition is true. Each content rewriting rule may be stored in a respective content item in a search index and in persistent storage 306, and may further include additional data including, but not limited to, a set of index names corresponding to index overlay structures for which the content rewriting rule is applicable, a set of user or user group names for which the content rewriting rule is applicable, and other metadata.

Overlay management component 310 may manage overlay structures and create new index overlay structures if necessary, such as, for example, index overlay structures 320-326. In some embodiments, index overlay structures such as, for example, index overlay structures 320-326, may include respective separate search indexes created by applying one or more content rewriting rules to content stored in a search index. Alternatively, different versions of documents may be kept in one search index, thereby, effectively merging multiple search indexes into a single search index. In the alternative embodiment, each version of a document relates either to an original search index or an index overlay structure. Overlay management component 310 manages a relationship between the index overlay structures and the documents.

In some embodiments, overlay management component 310 may decide when to perform content rewriting, may select documents to be rewritten, and may select content rewriting rules to apply to the selected documents. In a most basic embodiment, an administrator may define a time-based interval schedule for content rewriting, may select all documents of an administrator defined search index for rewriting, and may select all administrator defined content rewriting rules to be applied. In other embodiments, a user interface may be provided for an administrator to define a time-based interval schedule for rewriting content, or for the administrator to define a condition such that when the condition occurs content rewriting of all documents or selected documents may be performed. Further, the user interface may enable an administrator to select which of the documents are to be rewritten.

In a multitenant content management system, as shown in FIG. 3, search service 312 may access a respective search index for each tenant such as, for example, search indexes 318A-318N of FIG. 3. Each of search indexes 318A-318N may have associated therewith zero index overlay structures, one index overlay structure, or multiple index overlay structures. Each tenant may correspond to a respective entity and each entity may include multiple users.

When a new search query is received, overlay selection component 316 may determine whether to execute the search query against original content in an original search index or rewritten content in an index overlay structure.

In an embodiment, an administrator may associate a user or a user group with a set of index overlay structures. In this embodiment, overlay selection component 316 may select an index overlay structure associated with the user who issued a given search query, or overlay selection component 316 may select the index overlay structure associated with a user group to which the user who issued the given search query belongs, depending on whether the administrator associated the user or the user group with a set of index overlay structures.

Further, overlay selection component 316 may select a respective index overlay structure based on metadata associated with the respective index overlay structure. The metadata may include a set of keywords associated with each of the content rewriting rules used to create the respective index overlay structure. As an alternative, the metadata may include a set of keywords associated with each of the respective index overlay structures based on respective rewritten content stored in each of the respective index overlay structures. Overlay selection component 316 may compute a similarity measure, or distance, between the set of keywords associated with each of the content rewriting rules used to create each respective index overlay structure and a set of keywords associated with the one or more search terms of a search query, a query context, a history of previous queries associated with the search query, and feedback regarding search results of the previous queries. In some embodiments, overlay selection component 316 may compute a similarity measure, or distance, between the set of keywords associated with rewritten content stored in each respective index overlay structure and a set of keywords associated with the one or more search terms of a search query, a query context, a history of previous queries associated with the search query, and feedback regarding search results of the previous queries. With respect to the original search index, overlay selection component 316 may compute a similarity measure, or distance, between a set of keywords associated with content of the original search index and the set of keywords representing the one or more search terms of a search query, a query context, a history of previous search queries associated with the search query, and feedback regarding search results of the previous queries. Overlay selection component 316 may select the original search index or the search index from one of one or more index overlay structures associated with the original search index based on a lowest similarity score (indicating a highest similarity) and may provide the selected search index and the search query to search service 312 for performing the search.

Natural language processing may be employed when computing the similarity measure. The query context may include user context of the user issuing the search query (e.g., user location, user name, associated user groups, tenant name, client device type, previous search queries by the user, web tracking data, and implicit feedback gathered by user monitoring component 314). The implicit feedback may include, but not be limited to, search results selected by the user and dwell time with respect to each of the selected search results.

Overlay selection component 316 may have a dedicated subcomponent for creating a set of keywords from the user context. For example, in one implementation, the created set of keywords may be based on a name of the user, a client device name, a name of the user location, the search terms, and keywords from titles of documents the user interacted with recently. This information may be available from user monitoring component 314, which monitors content and search requests of users, and maintains and persists a history of search queries for each search index.

Figure 4:
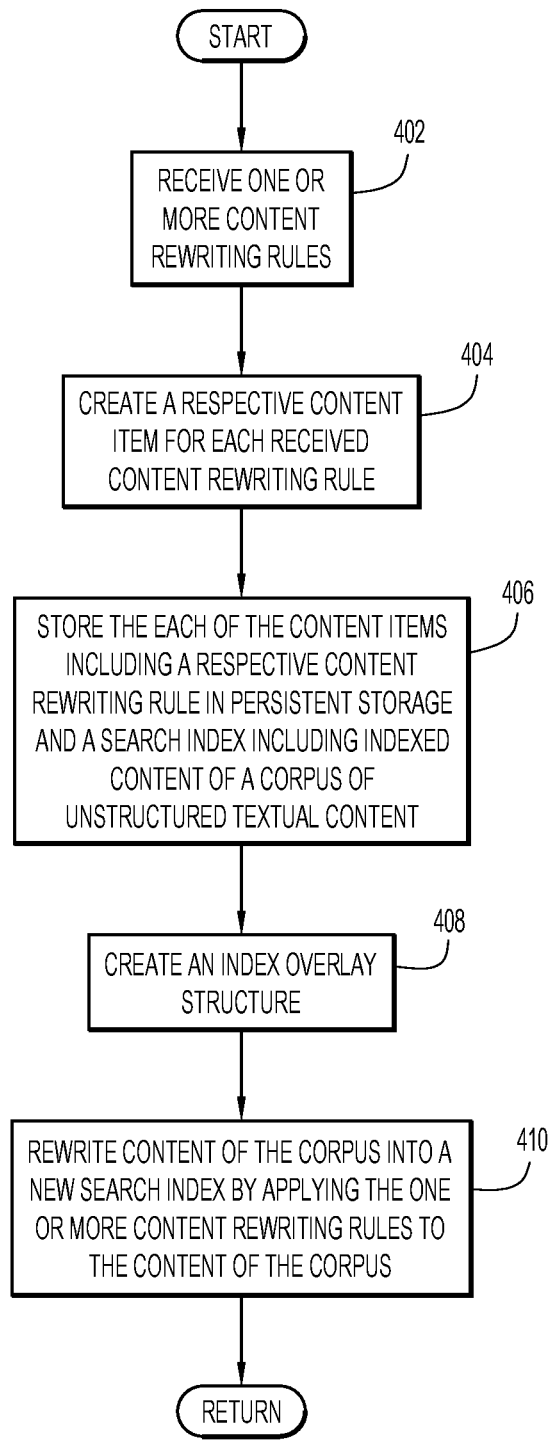
FIG. 4 is a flowchart of an example process for rewriting content of a corpus into a search index of an index overlay structure according to an embodiment of the present invention.

FIG. 4 is a flowchart illustrating example processing with respect to receiving and applying one or more content rewriting rules to content in a corpus. The process may begin by content rewriting component 308 of content management system 300 receiving the one or more content rewriting rules (act 402). Content rewriting component 308 may create a respective content item for each of the one or more content rewriting rules (act 404). The content item may be of a type specified for a content rewriting rule. Natural language processing may be performed on each respective content rewriting rule to extract keywords to be stored in the content item including the content rewriting rule. Content rewriting component 308 further may include other metadata in the content item. Each of the content items of type content rewriting rule may be stored in persistent storage 306 and in a search index such as, for example, one of search indexes 318A-318N, each of which indexes content of a respective corpus of unstructured textual content (act 406).

Overlay management component 310 may create an index overlay structure, which may be linked to the search index that includes original unmodified content (act 408). Content rewriting component 308 may rewrite content of the corpus of documents into a new search index, included in the index overlay structure, by applying the one or more content rewriting rules to the content of the corpus (act 410). The process then may be completed. In embodiments in which different versions of documents are stored in a single search index, the rewritten content may be written into the search index that includes the original content of the corpus. For example, in one embodiment, the rewritten content may be written to a new search index included in an overlay structure, which is further included in the single search index.

Figure 5:
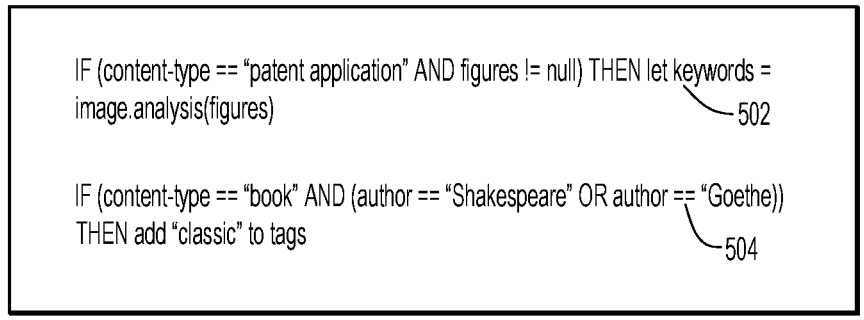
FIG. 5 shows example content rewriting rules written in pseudocode in an if-then format according to an embodiment of the present invention.

FIG. 5 shows two example content rewriting rules 502, 504 written as pseudocode in an if-then format. According to content rewriting rule 502, if a content item of type "content" in the search index corresponds to at least a portion of a document of document content type "patent application" in the corpus and further includes a "figures" field that has a value that is not equal to null, indicating a presence of figures, then the action portion of content rewriting rule 502 may be performed to invoke an image analysis function by passing a value of the field "figures" (e.g., a uniform resource locator (URL) or a path of a document including the figures) to an image analysis component, which may use artificial intelligence and/or other methods to analyze the figures and determine and return a set of keywords. Content rewriting component 308 then may include a field called "keywords" in a rewritten version of the content item of type content that is written to the search index (in an embodiment that stores multiple versions of content in a single search index) or is written to a search index in a separate index overlay structure. The field "keywords" may include the set of keywords returned by the image analysis component.

According to rule 504, if a content item of type content in the search index corresponds to at least a portion of a document of document content type "book" in the corpus, and further has a field called "author" with a value equal to "Shakespeare" or "Goethe", then content rewriting component 308 may rewrite the content item to include a tag having a value of "classic". Content rewriting component 308 may rewrite the content item to the search index (in an embodiment that that stores multiple versions of content in a single search index) or to a search index included in a separate index overlay structure.

Figure 6:
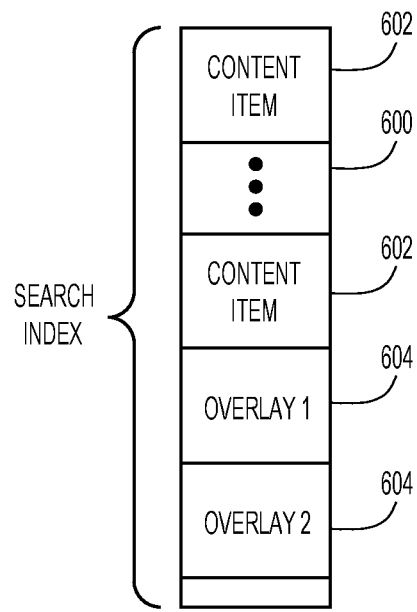
FIG. 6 shows an example search index in an embodiment of the present invention having index overlay structures stored within the search index.

FIG. 6 illustrates an example search index 600 in an embodiment in which content is rewritten to a single search index. Search index 600 may include multiple content items 602, some of which may correspond to at least respective portions of contents of documents of the corpus and others of which may include one or more content rewriting rules. Search index 600 may further include one or more index overlay structures 604, each having a corresponding search index.

Figure 7:
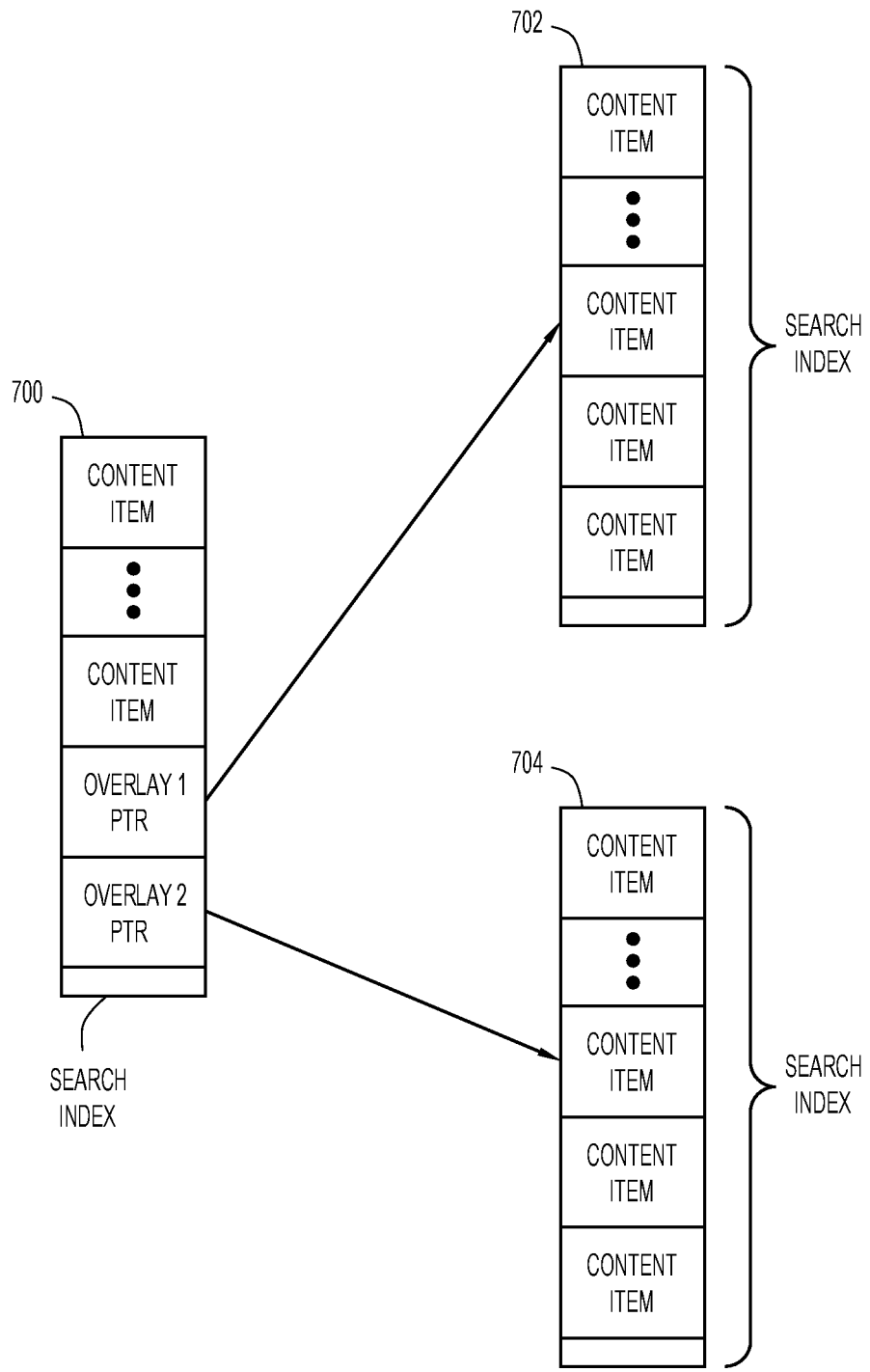
FIG. 7 illustrates an example search index and separate related search indexes included in respective index overlay structures according to an embodiment of the present invention.

FIG. 7 illustrates an example search index 700 and example index overlay structures 702, 704. Search index 700 may include multiple content items 602 as described with respect to search index 600. Instead of having stored therein index overlay structures, search index 700 may include one or more pointers 706 to corresponding index overlay structures 702, 704. Each of index overlay structures 702, 704 may include content items that include content rewritten by one or more content rewriting rules and stored in a search index included in the index overlay structure.

Figure 8:
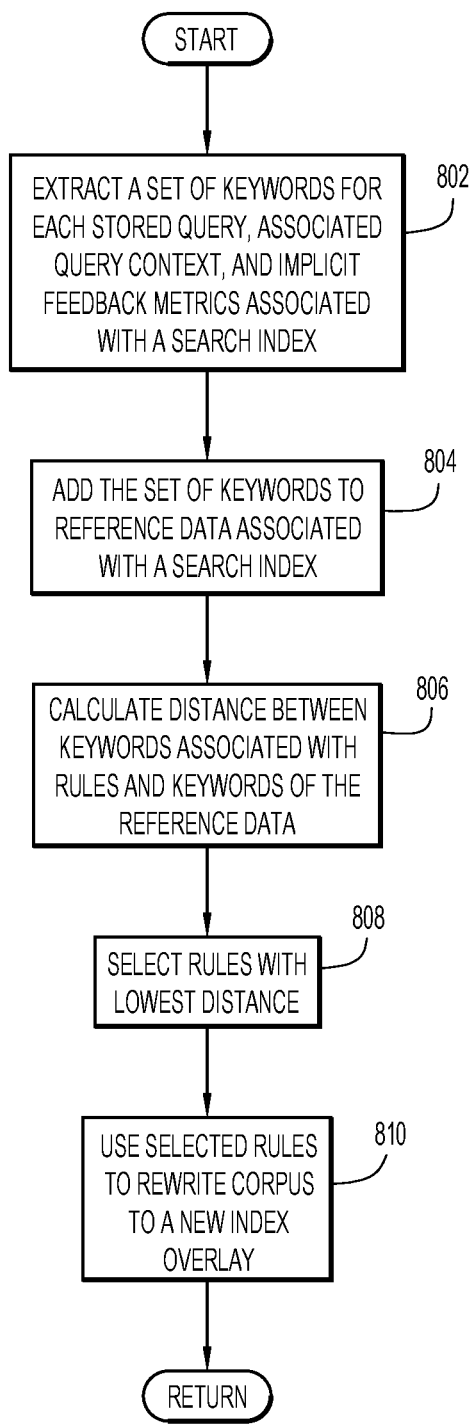
FIG. 8 is a flowchart of an example process for determining which content rewriting rules to select and using the selected content rewriting rules to rewrite a corpus to a new index overlay structure according to an embodiment of the present invention.

As mentioned previously, content rewriting may be performed according to a time-based interval schedule or according to an occurrence of a condition. FIG. 8 is a flowchart of an example process that may be performed to rewrite content of a corpus to a new index overlay structure. The process may begin with extracting a set of keywords for each stored query associated with an original search index, associated query context of the query, and implicit feedback metrics associated with the original search index (act 802).

In some embodiments, user monitoring component 314 may store queries associated with the original search index and may extract the set of keywords for each of the stored queries. User monitoring component 314 may provide the extracted sets of keywords to content rewriting component 308. Content rewriting component 308 may add the sets of keywords to reference data associated with the original search index (act 804). Duplicate keywords in the reference data may be eliminated in some embodiments.

Content rewriting component 308 may calculate a distance between keywords associated with content rewriting rules and keywords included in the reference data associated with the original search index (act 806). The calculated distance may be a similarity measure such that a smaller distance indicates a higher similarity than a larger distance. In some embodiments, when calculating the distance for each keyword associated with a content rewriting rule, the calculated distance is a smallest distance between the keyword associated with the content rewriting rule and one of the keywords included in the reference data associated with the original search index. A total distance, or similarity measure, for a content rewriting rule may be calculated as a sum of the calculated distances of each keyword associated with the content rewriting rule divided by a number of the keywords associated with the content rewriting rule. In other embodiments, the total distance, or the similarity measure, may be calculated using different methods.

Content rewriting component 308 may select one or more content rewriting rules having a lowest total distance up to a given number of content rewriting rules (act 808). Content rewriting component 308 may then apply the selected content rewriting rules to rewrite content of the corpus to a new search index in a new index overlay structure (act 810).

In some embodiments, instead of rewriting content corresponding to a complete corpus of documents, content corresponding to a subset of documents of the corpus may be rewritten.

It will be appreciated that the embodiments described above and illustrated in the drawings represent only a few of the many ways of implementing embodiments for automatically creating an optimized search index including content of a corpus to process search queries over the corpus more efficiently and with improved performance. Further, the described embodiments create the optimized search index in a faster, more efficient manner than methods used by existing content management systems.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information (e.g., search queries, query context data, user context data, etc.). The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for processing search queries, the computer-implemented method comprising:
   receiving, by a computing device executing a content management system, a content rewriting rule;
   storing, by the computing device, a content item including the content rewriting rule in a first search index including content rewriting rules and indexed content of a corpus of documents having unstructured textual content;
   rewriting, by the computing device, the content of the corpus of documents into a second search index by applying the content rewriting rule of the first search index to the content of the corpus of documents, wherein an index overlay structure is linked to the first search index and includes the second search index comprising the content of the corpus of documents rewritten according to the content rewriting rules of the first search index; and
   using, by the computing device, the second search index of rewritten content to search the content of the corpus of documents for content satisfying a received search query.

2. The computer-implemented method of claim 1, wherein the rewriting the content of the corpus of documents further comprises:
   creating a set of new content items in the second search index by applying the content rewriting rule to the indexed content of the corpus of documents in the first search index to produce the set of new content items.

3. The computer-implemented method of claim 1, wherein the second search index is separate from the first search index.

4. The computer-implemented method of claim 1, wherein the first search index includes the index overlay structure.

5. The computer-implemented method of claim 1, further comprising:
   receiving, by the computing device, a second search query;
   determining, by the computing device, which index overlay structure of a plurality of index overlay structures linked to the first search index to use for the second search query based on respective computed distances between a respective set of keywords associated with each index overlay structure and a set of keywords associated with one or more search terms of the second search query, a query context of the second search query, a history of previous queries associated with the second search query, and feedback regarding search results of the previous queries;
   performing, by the computing device, the second search query using the determined index overlay structure; and
   providing, by the computing device, search results from performing the second search query.

6. The computer-implemented method of claim 1, further comprising:
   maintaining and persisting a history of search queries for the first search index;
   determining a set of keywords based on the history of search queries for the first search index;
   associating the set of keywords with the first search index;
   computing a distance between a set of keywords associated with each content rewriting rule included in the first search index and the set of keywords associated with the first search index;

selecting, based on the computed distance, up to a given number of content rewriting rules for creating a new optimized second search index in a new index overlay structure; and rewriting the content of the corpus of documents into the new optimized second search index by applying the selected content rewriting rules to the content of the corpus of documents.

7. The computer-implemented method of claim 1, wherein each content rewriting rule defines a condition and an action to be performed when the corresponding condition occurs for content items of the corpus of documents.

8. A computing system for processing search queries, the computing system comprising:

at least one processor; and a memory connected to the at least one processor, the at least one processor being configured to perform:

receiving a content rewriting rule;

storing a content item including the content rewriting rule in a first search index including content rewriting rules and indexed content of a corpus of documents having unstructured textual content;

rewriting the content of the corpus of documents into a second search index by applying the content rewriting rule of the first search index to the content of the corpus of documents, wherein an index overlay structure is linked to the first search index and includes the second search index comprising the content of the corpus of documents rewritten according to the content rewriting rules of the first search index; and using the second search index of rewritten content to search the content of the corpus of documents for content satisfying a received search query.

9. The computing system of claim 8, wherein the rewriting the content of the corpus of documents further comprises:

creating a set of new content items in the second search index by applying the content rewriting rule to the indexed content of the corpus of documents in the first search index to produce the set of new content items.

10. The computing system of claim 8, wherein the second search index is separate from the first search index.

11. The computing system of claim 8, wherein the first search index includes the index overlay structure.

12. The computing system of claim 8, wherein the at least one processor is configured to perform:

receiving a second search query;

determining which index overlay structure of a plurality of index overlay structures linked to the first search index to use for the second search query based on one or more respective computed distances between a respective set of keywords associated with each index overlay structure and a set of keywords associated with one or more search terms of the second search query, a query context of the second search query, a history of previous queries associated with the second search query, and feedback regarding search results of the previous queries;

performing the second search query using the determined index overlay structure; and providing search results from performing the second search query.

13. The computing system of claim 8, wherein the at least one processor is further configured to perform:

maintaining and persisting a history of search queries for the first search index;

determining a set of keywords based on the history of search queries for the first search index;

associating the set of keywords with the first search index;

computing a distance between a set of keywords associated with each content rewriting rule included in the first search index and the set of keywords associated with the first search index;

selecting, based on the computed distance, up to a given number of content rewriting rules for creating a new optimized second search index in a new index overlay structure; and rewriting the content of the corpus of documents into the new optimized second search index by applying the selected content rewriting rules to the content of the corpus of documents.

14. The computing system of claim 8, wherein each content rewriting rule defines a condition and an action to be performed when the corresponding condition occurs for content items of the corpus of documents.

15. A computer program product for processing search queries, the computer program product comprising at least one computer readable storage medium having computer readable program code embodied therewith for execution on one or more processors, the computer readable program code being configured to be executed by the one or more processors to perform:

receiving a content rewriting rule;

storing a content item including the content rewriting rule in a first search index including content rewriting rules and indexed content of a corpus of documents having unstructured textual content;

rewriting the content of the corpus of documents into a second search index by applying the content rewriting rule of the first search index to the content of the corpus of documents, wherein an index overlay structure is linked to the first search index and includes the second search index comprising the content of the corpus of documents rewritten according to the content rewriting rules of the first search index; and using the second search index of rewritten content to search the content of the corpus of documents for content satisfying a received search query.

16. The computer program product of claim 15, wherein the rewriting the content of the corpus of documents further comprises:

creating a set of new content items in the second search index by applying the content rewriting rule to the indexed content of the corpus of documents in the first search index to produce the set of new content items.

17. The computer program product of claim 15, wherein the second search index is separate from the first search index.

18. The computer program product of claim 15, wherein the first search index includes the index overlay structure.

19. The computer program product of claim 15, wherein the computer readable program code is further configured to be executed by the one or more processors to perform:

receiving a second search query;

determining which index overlay structure of a plurality of index overlay structures linked to the first search index to use for the second search query based on respective computed distances between a respective set of keywords associated with each index overlay structure and a set of keywords associated with one or more search terms of the second search query, a query context of the second search query, a history of previous queries associated with the second search query, and feedback regarding search results of the previous queries;

performing the second search query using the determined index overlay structure; and providing search results from performing the second search query.

20. The computer program product of claim 15, wherein the computer readable program code is further configured to be executed by the one or more processors to perform:

maintaining and persisting a history of search queries for the first search index;

determining a set of keywords based on the history of search queries for the first search index;

associating the set of keywords with the first search index;

computing a distance between a set of keywords associated with each content rewriting rule included in the first search index and the set of keywords associated with the first search index;

selecting, based on the computed distance, up to a given number of content rewriting rules for creating a new optimized second search index in a new index overlay structure; and rewriting the content of the corpus of documents into the new optimized second search index by applying the selected content rewriting rules to the content of the corpus of documents.

* * * * *